United States Patent

Maddali et al.

[11] Patent Number: 5,554,923
[45] Date of Patent: Sep. 10, 1996

[54] VOLTAGE REGULATOR AND METHOD FOR DC POWER GENERATING SYSTEM

[75] Inventors: Vijay Maddali; John F. Defenbaugh; Hassan Mansir, all of Rockford, Ill.

[73] Assignee: Sundstrand Corporation, Rockford, Ill.

[21] Appl. No.: 457,549

[22] Filed: Jun. 1, 1995

[51] Int. Cl.$^6$ ............................................. H02P 9/00
[52] U.S. Cl. .................. 322/25; 322/27; 363/21
[58] Field of Search ........................... 322/10, 25, 27, 322/28; 363/21

[56] References Cited

U.S. PATENT DOCUMENTS

| | | | |
|---|---|---|---|
| 4,404,473 | 9/1983 | Fox | 307/125 |
| 4,446,417 | 5/1984 | Fox et al. | 322/25 |
| 4,486,801 | 12/1984 | Jackovich et al. | 361/21 |
| 4,807,106 | 2/1989 | Baker et al. | 363/84 |
| 4,933,622 | 6/1990 | Fox et al. | 320/1 |
| 4,933,623 | 6/1990 | Fox | 322/25 |
| 4,943,761 | 7/1990 | Fox et al. | 323/283 |
| 4,988,941 | 1/1991 | Fox | 322/28 |
| 5,017,857 | 5/1991 | Fox | 322/25 |
| 5,406,189 | 4/1995 | Wohlberg et al. | 322/10 |

*Primary Examiner*—Steven L. Stephan
*Assistant Examiner*—Nicholas Ponomarenko
*Attorney, Agent, or Firm*—Jeffery J. Makeever

[57] ABSTRACT

A voltage regulator for a DC power generation system which is comprised of a prime mover driven generator producing an AC voltage output which is rectified to a DC voltage output for use by the system senses the AC voltage output and the DC voltage output, and selects the lower of these two for comparison with a voltage reference to produce a voltage error output signal for use in controlling the DC voltage output. The voltage regulator further comprises tuned compensation of the error output signal prior to use in controlling the DC voltage output. The tuned compensation comprises a proportional-integral lead-lag network. The voltage regulator additionally senses the AC current generated by the generator, and adjusts at least one zero location of the compensation network in response thereto to improve stability margins during light loading conditions, and to improve transient performance requirements under heavier loading conditions.

11 Claims, 3 Drawing Sheets

VOLTAGE REGULATOR AND METHOD FOR DC POWER GENERATING SYSTEM

FIELD OF THE INVENTION

The instant invention relates generally to voltage regulation, and more particularly to voltage regulation of DC power generation systems.

BACKGROUND ART

As modem aircraft are designed to take advantage of the cost, weight, and performance advantages afforded by DC power generation and distribution as the primary power for the aircraft utilization equipment, the requirements governing power quality have become much more stringent. Not only must the DC voltage regulation provide a set voltage that is stable over the entire speed and load range of the generator and limit the current output of the generator to prevent system damage during faults, but it must also meet increased dynamic performance requirements. These performance requirements include rapid transient recovery and low source impedance characteristics in the range of frequencies governed by the voltage regulator.

One voltage regulation approach to meet the performance requirements of a modem DC power generation and distribution system is described in U.S. Pat. No. 4,933,622, issued Jun. 12, 1990, for a Circuit and Method for Discharging DC Filter Capacitors, to David A. Fox and Ralph Jessee, and assigned to the assignee of the instant application. This patent describes that the output filter capacitor of the DC generation system must be sufficiently large to provide a low output impedance, but that the use of such a large capacitor adversely effects the dynamic performance of the system due to its inherent energy storage properties and slow discharge rate, especially at light system loads. The Fox et al. system provides a capacitor discharge circuit which provides a discharge path for the capacitor voltage when it is seen to increase beyond a set point, particularly in response to a sudden load removal from the system. The sensing control for this circuit is derived primarily from a DC voltage sensor, although Fox et al. indicates that providing AC voltage sensing in addition to the DC is an option as well. While this system presents a marked improvement over the previous control systems known in the art, the additionally capacitive discharge circuitry may be disadvantageous in some applications.

Another method and circuit for voltage regulation of DC power sources is described in U.S. Pat. No. 4,807,106, issued Feb. 21, 1989, to Donal Baker, David Fox, and Roger Thornton, and assigned to the assignee of the instant application. This system does not require the capacitive discharge circuitry of the above referenced system, but instead utilizes an AC voltage sense summed with the generator exciter field current to control the DC output. The control additionally provides that the AC voltage based control be trimmed by a DC voltage sense. This DC trim loop typically has a limited range to allow compensation only for loading and temperature effects. The response time of this DC voltage trim loop is also delayed so as to not interfere with the AC loop to allow primary generator control to track the AC generator output. This is intended to ensure that the output of the generator does not collapse during no load conditions when the output capacitor is not being discharged by any connected load.

While both of these systems improve the DC output voltage regulation over the prior known regulation schemes, transient requirements for new aircraft are much more aggressive, especially in the required source impedance characteristic in the range of frequencies governed by the voltage regulator. The instant invention meets these latest functional requirements for voltage regulation of DC power generation systems without the need for added output capacitance and its associated capacitive discharge circuitry or actively clamped and time delayed DC trim loops.

SUMMARY OF THE INVENTION

It is the principal objective of the instant invention to provide a new and improved voltage regulator for a DC power generating system. More particularly, it is the objective of the instant invention to provide a voltage regulator for a DC power generating system which provides increased transient response and increased stability over all loading conditions. It is a further objective of the invention to provide a voltage regulator which decreases the source impedance characteristics in the range of frequencies governed by the voltage regulator.

These objectives of the instant invention are achieved by providing a voltage regulator tar a DC power generation system comprised of a prime mover driven generator which produces an AC voltage output rectified to a DC voltage output for use by the system. The voltage regulator senses the AC voltage output and the DC voltage output and selects the lower of these two for comparison with a voltage reference to produce a voltage error output signal for use in controlling the DC voltage output. The voltage regulator further comprises tuned compensation of the error output signal prior to use in controlling the DC voltage output. The tuned compensation preferably comprises a proportional-integral lead-lag network. The voltage regulator additionally senses the AC current generated by the generator, and adjusts at least one zero location of the compensation network in response thereto to improve stability margins during light loading conditions and to improve transient performance requirements under heavier loading conditions.

The method of regulation, therefore, comprises the steps of sensing the AC output voltage; sensing the DC output voltage; comparing the lower of the AC output voltage and the DC output voltage to a reference voltage to produce an error signal; compensating the error signal; and adjusting excitation to the AC generator in response to the compensated error signal. Preferably, the method further comprises the steps of sensing AC output current, and adjusting a zero location of the compensating step in response to this sensed AC output current. In a highly preferred method, the step of adjusting the zero location comprises the step of reducing the zero location when the AC output current is below a predetermined threshold and the step of increasing the zero location when the AC output current is above another predetermined threshold.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
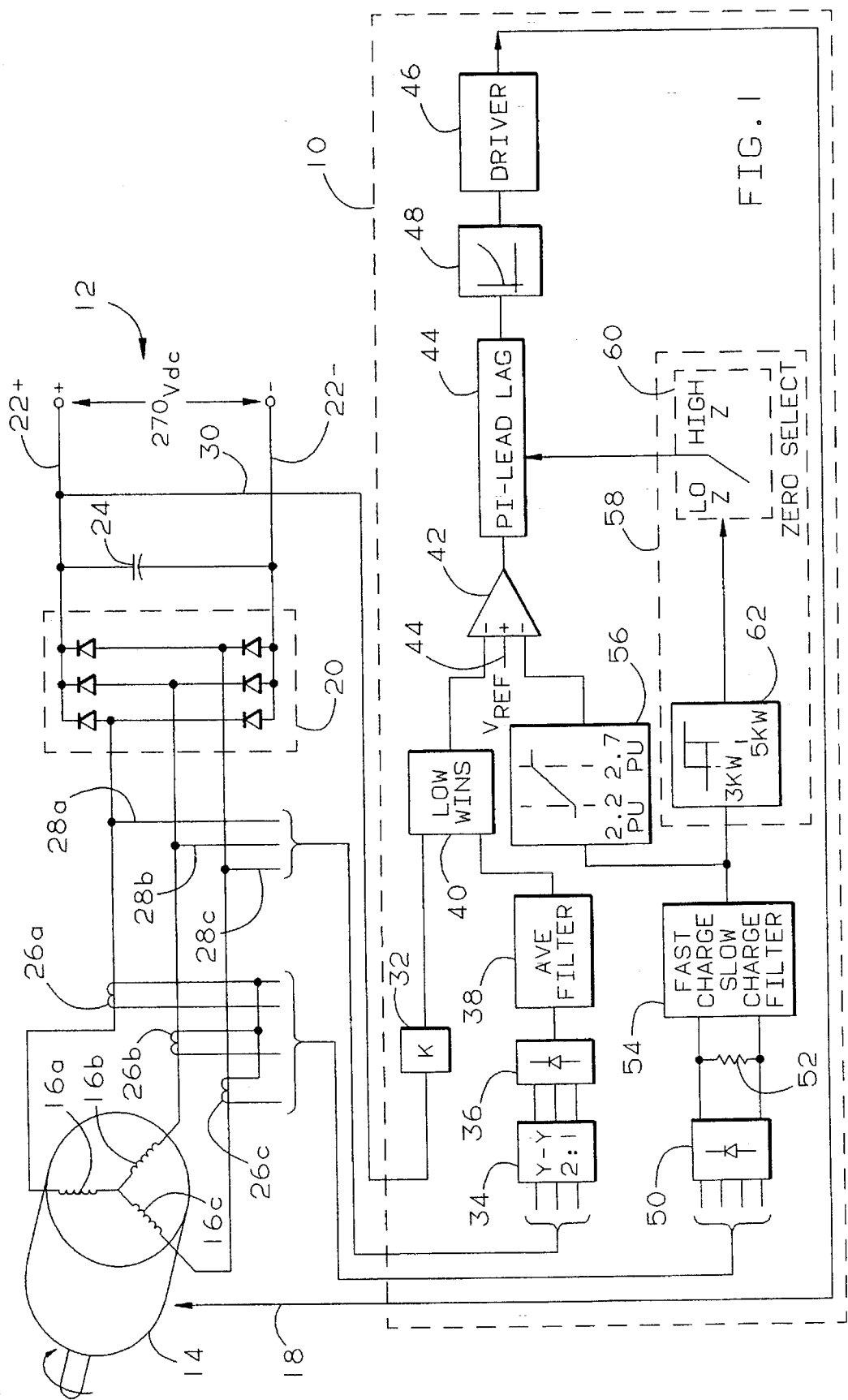
FIG. 1 is a single line block diagram of an embodiment of the instant invention.

A voltage regulator 10 for use in a DC power generation system 12 in accordance with a preferred embodiment of the instant invention is illustrated in FIG. 1. The DC system 12 comprises a prime mover driven generator 14 having a plurality of windings 16a, 16b, and 16c which produce an AC output in response to an excitation signal 18 generated by the voltage regulator 10. The AC output is rectified by a bridge rectifier 20 to form a DC voltage output on conductors 22$^+$ and 22$^-$ and across output capacitor 24. While not illustrated therein, the generator 14 may be driven by any type of prime mover including, preferably, an aircraft engine. Additionally, as will be recognized by one skilled in the art, the generator 14 may included more or fewer output phases depending on system requirements. As illustrated therein, a preferred embodiment of the instant invention regulates a DC power generation system which develops a constant 270 Vdc power output for use on an aircraft, although other voltage magnitudes may be appropriate.

A preferred embodiment of the voltage regulator 10 of the instant invention includes means for sensing the AC current generated by the generator 14 in response to the connected DC load (not shown). As illustrated in FIG. 1, these means comprise current transformers 26a, 26b, and 26c, although other conventional AC current sensing may be employed as appropriate. The voltage regulator 10 also senses the generated AC voltage output by means such as sensing leads 28a, 28b, and 28c, and the rectified DC voltage by means such as sensing lead 30. Within the voltage regulator 10 the sensed DC voltage is scaled by voltage divider 32 which, in this exemplary embodiment, scales the sensed DC voltage by 51. The sensed AC voltage is input to a wye-wye step-down isolation transformer 34 and rectified to a DC level by rectifier 36. The output of rectifier 36 is then filtered by an averaging filter 38 having a transfer function, in this exemplary embodiment, of $$\frac{1}{\frac{s}{2\Pi 600}+1}.$$

The output of the filter 38 and the scaling circuit 32 are input to a means for selecting only the lower of the two signals for use in regulating the DC output voltage. This function may be implemented, as illustrated in FIG. 1, by a "low wins" circuit 40. The output of the low wins circuit 40 is input to means, illustrated as comparator 42, for comparing this signal to a reference voltage signal 44. The comparator 42 generates an error signal which represents a deviation in the output DC voltage from the predetermined system set point (270 Vdc). This error signal is then conditioned by a tuned compensation means, such as is illustrated by a proportional-integral lead lag network 44. The compensated error signal is utilized by an exciter field driver circuit 46 to adjust the output of the generator 14 by adjusting the excitation signal 18. In a highly preferred embodiment, the compensated error signal is first processed by a non-linear gain 48 to improve the impedance requirements of the system over the entire range of system speed. Preferably, a gain variation of 3 to 1 from low speed to high speed is desired, however gain variations of as low as 1.7 to 1 are sufficient depending on the impedance requirements imposed on the system. The gain range is directly a function of the generator, speed, and load characteristics of the system, and may be varied substantially in differing applications without departing from the spirit of the invention. If the speed of the prime mover is controlled within a narrow band, or if the impedance requirements of the system are relaxed, this non-linear gain 48 may be eliminated.

The AC current sensed by current transformers 26a–c is passed through rectifier 50 and develops a voltage across resistor 52. This voltage is filtered by a fast charging, slow discharging filter 54 and is utilized by means, such as voltage fold back circuit 56, for reducing the DC voltage output voltage upon sensing that the generator 14 is supplying too much current. The output of this voltage fold back circuit 56 is utilized by the comparator 42 to adjust the error signal which then reduces the excitation to the generator 14 to maintain the total output power of the system at a predetermined level. Preferably, this circuit 56 begins folding back the generator voltage at approximately 2.2 per unit current output of the generator 14.

Figure 3:
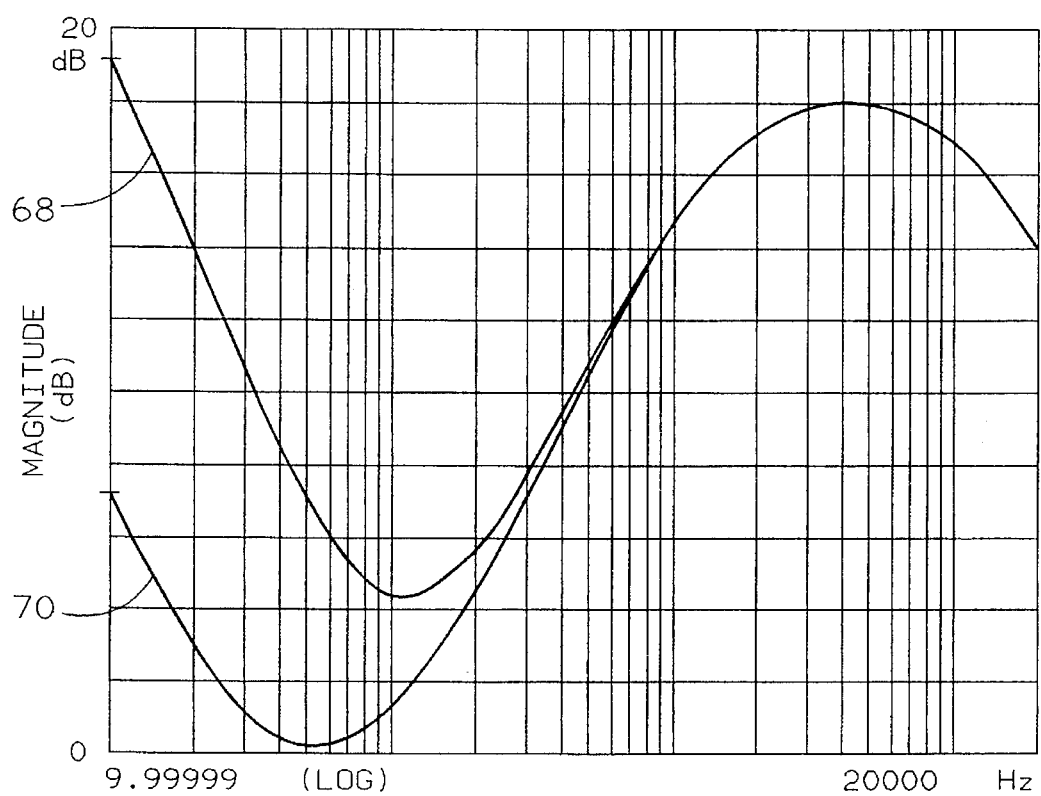
FIG. 3 is a graphic illustration of the controller transfer function of an embodiment of the instant invention.

The output of the filter 54 is also used by means 58 to adjust the zero location of the tuned compensation network 44. This adjustment is required to meet the impedance and transient requirements at all loading conditions while maintain adequate stability margins. Having the compensation network 44 tuned to meet output impedance requirements, the stability margins at light loads may be inadequate due to the effects of capacitor 24. The adjustment to the compensation may be continuous, or may, as in a preferred embodiment of the instant invention, utilize means 58 comprising a means for switching zero location 60 controlled by hysterisis means 62. At light loads where the low impedance specifications for the system do not apply, the zero location is reduced, thereby improving the stability margins of the system. Under heavier loads the zero location is increased to meet the transient performance requirements of the system. In an exemplary system having a rating of 65 kW, the switching points between light and heavier loads is 3 kW and 5 kW. In this exemplary system the compensation network would preferably have a system transfer function of:

$$\frac{(s+2\Pi Z)(s+2\Pi 125)}{s(s+2\Pi 1250)}$$

where: Z=130 Hz for light loads and 28 Hz for heavier loads. FIG. 3 illustrates the transfer function of the tuned compensator 44 at both the high zero compensation 68, and the low zero compensation 70.

Figure 2:
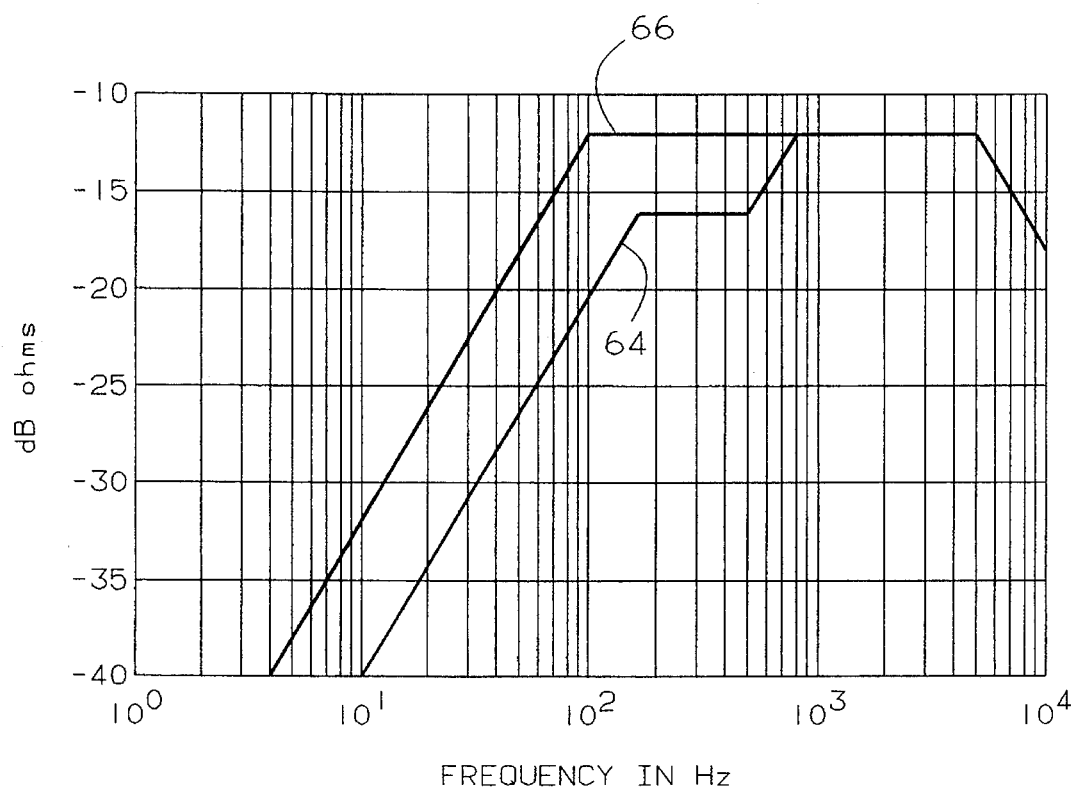
FIG. 2 is a graphic illustration of the reduction of source impedance over the range of frequencies governed by the instant invention compared to typical source impedance levels.

FIG. 2 illustrates the reduction in source impedance over the range of frequencies governed by the instant invention. As may be observed, line 64 is the source impedance resulting from the use of the voltage regulator of the instant invention while line 66 is that resulting from the use of a conventional voltage regulator design.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive right to all modifications which come within the scope of the appended claims is reserved.

We claim:

1. A voltage regulator for a DC power generation system having a prime mover driven generator for producing an AC voltage output, the AC voltage output being rectified to a DC voltage output for use by the system, comprising:

first means for sensing the AC voltage output, said first means producing a first voltage sense signal proportional to the AC voltage output;

second means for sensing the DC voltage output, said second means producing a second voltage sense signal proportional to the DC voltage output;

third means coupled to said first means and said second means for selecting the lower of said first voltage sense signal and said second voltage sense signal for use in controlling the DC voltage output.

2. The voltage regulator of claim 1, further comprising:

fourth means for sensing AC current generated by the generator, said fourth means producing a fourth current sense signal proportional to said AC current;

fifth means for comparing said lower of said first voltage sense signal and said second voltage sense signal as selected by said third means with a voltage reference signal, said fifth means producing an error output signal;

sixth means for compensating said error output signal prior to use in controlling the DC voltage output, said sixth means having at least one zero location; and seventh means for adjusting said at least one zero location of said sixth means in response to said fourth current sense signal.

3. The voltage regulator of claim 2, wherein said seventh means comprises a switching means responsive to said fourth current sense signal for reducing said zero location during low current conditions and for increasing said zero location during high current conditions.

4. The voltage regulator of claim 2, further comprising eighth means responsive to said fourth current sense signal for reducing the DC voltage output when said fourth current sense signal exceeds a predetermined threshold.

5. The voltage regulator of claim 4, wherein said eighth means reduces the DC voltage output in a linear manner to maintain a maximum power output level.

6. The voltage regulator of claim 1, wherein said first means comprises:

a plurality of AC voltage sensors, each of said plurality of AC voltage sensors coupled to a phase of the AC generator for sensing the AC voltage output;

a rectifier circuit coupled to said AC voltage sensors, said rectifier circuit producing a first DC output signal proportional to the AC voltage output; and an average filter coupled to said rectifier for filtering said first DC output signal, said average filter producing said first voltage sense signal for use by said third means.

7. The voltage regulator of claim 6, wherein said first means additionally comprises a step down isolation transformer interposed between said AC voltage sensors and said rectifier circuit.

8. A method of regulating DC output voltage produced by rectification of an AC output voltage from a generator, comprising:

sensing the AC output voltage;

sensing the DC output voltage;

comparing the lower of the AC output voltage and the DC output voltage to a reference voltage to produce an error signal;

compensating said error signal; and adjusting excitation to the AC generator in response to said compensated error signal.

9. The method of claim 8, further comprising the steps of:

sensing AC output current; and adjusting a zero location of said compensating step in response to said AC output current.

10. The method of claim 9, wherein said step of adjusting a zero location comprises the step of reducing said zero location when said AC output current is below a second predetermined threshold and the step of increasing said zero location when said AC output current is above a third predetermined threshold.

11. The method of claim 9, further comprising the step of reducing said excitation in response to said AC output current exceeding a first predetermined threshold.

* * * * *